US009986243B2

(12) United States Patent
Saito

(10) Patent No.: US 9,986,243 B2
(45) Date of Patent: May 29, 2018

(54) IMAGE PROCESSOR

(71) Applicant: MegaChips Corporation, Osaka-shi (JP)

(72) Inventor: Kazuhiro Saito, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 476 days.

(21) Appl. No.: 14/228,814

(22) Filed: Mar. 28, 2014

(65) Prior Publication Data
US 2014/0294098 A1 Oct. 2, 2014

(30) Foreign Application Priority Data

Mar. 29, 2013 (JP) ................. 2013-075270

(51) Int. Cl.
*H04N 19/127* (2014.01)
*H04N 19/136* (2014.01)
*H04N 19/172* (2014.01)
*H04N 19/12* (2014.01)
*H04N 19/156* (2014.01)
*H04N 19/42* (2014.01)

(52) U.S. Cl.
CPC ........... *H04N 19/136* (2014.11); *H04N 19/12* (2014.11); *H04N 19/156* (2014.11); *H04N 19/172* (2014.11); *H04N 19/42* (2014.11)

(58) Field of Classification Search
CPC .. H04N 19/136; H04N 19/172; H04N 19/156; H04N 19/42; H04N 19/12
See application file for complete search history.

(56) References Cited

U.S. PATENT DOCUMENTS 6,429,902 B1 * 8/2002 Har-Chen ............... H04N 5/04
348/464
6,761,635 B2 * 7/2004 Hoshino ................. H04L 1/08
348/734

(Continued)

FOREIGN PATENT DOCUMENTS

JP  10-136379   5/1998
JP  2001-128170 5/2001

(Continued)

OTHER PUBLICATIONS

U.S. Appl. No. 14/284,588, filed May 22, 2014, Saito.
Office Action issued in Japanese Application No. JP2013-075270 dated Feb. 24, 2017.

*Primary Examiner* — Sath V Perungavoor
*Assistant Examiner* — Philip Dang
(74) *Attorney, Agent, or Firm* — Oblon, McClelland, Maier & Neustadt, L.L.P.

(57) ABSTRACT

In the multi mode, the software processing unit notifies the hardware processing unit by batch of multiple settings information sets about multiple output pictures before the hardware processing unit starts to encode an input picture, and the hardware processing unit performs continuous encoding for the output pictures, based on the settings information sets notified of by the software processing unit, without a notification signifying a completion for every picture, and upon completion of encoding for all of the output pictures, sends an interrupt notification signifying a completion of encoding to the software processing unit.

11 Claims, 11 Drawing Sheets

(56) References Cited

U.S. PATENT DOCUMENTS

| | | | | | |
|---|---|---|---|---|---|
| 6,801,250 | B1* | 10/2004 | Miyashita | G06T 3/4015 | 348/208.13 |
| 6,809,764 | B1* | 10/2004 | Misawa | H04N 9/045 | 250/208.1 |
| 7,471,314 | B2* | 12/2008 | Ogikubo | G11B 27/005 | 348/207.99 |
| 7,675,539 | B2* | 3/2010 | Matsui | H04N 5/232 | 348/14.08 |
| 7,680,182 | B2* | 3/2010 | Toma | G11B 27/105 | 375/240.01 |
| 7,734,104 | B2* | 6/2010 | Yamane | H04N 19/172 | 382/232 |
| 7,848,407 | B2* | 12/2010 | Yoon | H04N 21/8451 | 375/240.01 |
| 7,885,336 | B2* | 2/2011 | Wong | H04N 19/70 | 375/240.25 |
| 8,009,872 | B2* | 8/2011 | Kurata | H04N 5/23248 | 348/208.2 |
| 8,279,946 | B2* | 10/2012 | Mak-Fan | H04N 21/41407 | 348/423.1 |
| 8,284,082 | B2* | 10/2012 | Rao | H04N 19/172 | 341/51 |
| 2009/0021645 | A1* | 1/2009 | Hayashi | G06T 5/002 | 348/607 |
| 2009/0034610 | A1* | 2/2009 | Lee | H04N 21/23406 | 375/240.02 |
| 2009/0208137 | A1* | 8/2009 | Urushihara | G06T 3/4007 | 382/300 |
| 2010/0150519 | A1* | 6/2010 | Takanohashi | H04N 5/783 | 386/278 |
| 2011/0164679 | A1* | 7/2011 | Satou | H04N 19/172 | 375/240.03 |
| 2011/0234894 | A1* | 9/2011 | Van Eggelen | H04N 7/01 | 348/441 |
| 2011/0310099 | A1* | 12/2011 | Yamana | G09G 3/003 | 345/419 |
| 2012/0020413 | A1* | 1/2012 | Chen | H04N 19/597 | 375/240.26 |
| 2012/0092506 | A1* | 4/2012 | Ino | H04N 5/232 | 348/207.1 |
| 2012/0106933 | A1* | 5/2012 | Ralston | H03M 7/40 | 386/355 |
| 2013/0007185 | A1* | 1/2013 | McFadzean | H04N 21/2393 | 709/213 |

FOREIGN PATENT DOCUMENTS

| | | |
|---|---|---|
| JP | 2005-79621 | 3/2005 |
| JP | 2005-318411 | 11/2005 |
| JP | 2007-19902 | 1/2007 |
| JP | 2009-153020 | 7/2009 |
| JP | 2010-272993 | 12/2010 |
| JP | 2012-227602 | 11/2012 |

* cited by examiner

FIG.6

| Use | Size | fps | Network transmission rate (Mbps) |
|---|---|---|---|
| Recording | 1920x1080 | 30 | 20 |
| | 640x480 | 30 | 3 |
| | 320x240 | 30 | 0.75 |
| Delivery (High rate) | 1920x1080 | 30 | 30 |
| | 640x480 | 30 | 3 |
| | 320x240 | 30 | 0.6 |
| Delivery (Low rate) | 1920x1080 | 10 | 6 |
| | 640x480 | 10 | 1.5 |
| | 320x240 | 10 | 0.3 |

FIG. 7

| Sequences No. | Use | Size | fps |
|---|---|---|---|
| SEQ00 | Recording | 1920x1080 | 30 |
| SEQ01 | | 640x360 | 30 |
| SEQ02 | | 320x180 | 30 |
| SEQ10 | Delivery (High rate) | 1920x1080 | 15 |
| SEQ11 | | 640x360 | 15 |
| SEQ12 | | 320x180 | 15 |
| SEQ20 | Delivery (Low rate) | 1920x1080 | 10 |
| SEQ21 | | 640x360 | 10 |
| SEQ22 | | 320x180 | 10 |

FIG. 8

| Sequences No. | Use | Size | fps |
|---|---|---|---|
| SEQ00 | Recording | 1920x1080 | 30 |
| SEQ01 | | 640x360 | 30 |
| SEQ02 | | 320x180 | 30 |
| SEQ10 | Delivery (High rate) | 1920x1080 | 30 |
| SEQ11 | | 320x180 | 30 |
| SEQ12 | | 320x180 | 30 |
| SEQ20 | Delivery (Low rate) | 1920x1080 | 10 |
| SEQ21 | | 640x360 | 10 |
| SEQ22 | | 320x180 | 10 |

FIG. 9

| Sequences No. | Use | Size | fps |
|---|---|---|---|
| SEQ00 | Recording | 1920x1080 | 30 |
| SEQ01 | | 640x360 | 30 |
| SEQ02 | | 320x180 | 30 |
| SEQ10 | Delivery (High rate) | 1280x720 | 30 |
| SEQ11 | | 320x180 | 30 |
| SEQ12 | | 320x180 | 30 |
| SEQ20 | Delivery (Low rate) | 1280x720 | 30 |
| SEQ21 | | 640x360 | 30 |
| SEQ22 | | 320x180 | 30 |

FIG. 10

|  | V1 | V2 | V3 | V4 | V5 | V6 | V7 | V8 | V9 |
|---|---|---|---|---|---|---|---|---|---|
| SEQ00 | O | O | O | O | O | O | O | O | O |
| SEQ01 | O | O | O | O | O | O | O | O | O |
| SEQ02 | O | O | O | O | O | O | O | O | O |
| SEQ10 | O |  | O |  | O |  | O |  | O |
| SEQ11 | O |  | O |  | O |  | O |  | O |
| SEQ12 | O |  | O |  | O |  | O |  | O |
| SEQ20 | O |  |  | O |  |  | O |  |  |
| SEQ21 | O |  |  | O |  |  | O |  |  |
| SEQ22 | O |  |  | O |  |  | O |  |  |
| Number of pictures | 9 | 3 | 6 | 6 | 6 | 3 | 9 | 3 | 6 |
| Number of completion notifications | 1 | 1 | 1 | 1 | 1 | 1 | 1 | 1 | 1 |

FIG. 11

|  | V1 | V2 | V3 | V4 | V5 | V6 | V7 | V8 | V9 |
|---|---|---|---|---|---|---|---|---|---|
| SEQ00 | O | O | O | O | O | O | O | O | O |
| SEQ01 | O | O | O | O | O | O | O | O | O |
| SEQ02 | O | O | O | O | O | O | O | O | O |
| SEQ10 | O |  | O |  | O |  | O |  | O |
| SEQ11 | O |  | O |  | O |  | O |  | O |
| SEQ12 | O |  | O |  | O |  | O |  | O |
| SEQ20 | O |  |  | O |  |  | O |  |  |
| SEQ21 | O |  |  | O |  |  | O |  |  |
| SEQ22 | O |  |  | O |  |  | O |  |  |
| Number of pictures | 9 | 3 | 6 | 6 | 6 | 3 | 9 | 3 | 6 |
| Number of completion notifications | 9 | 3 | 6 | 6 | 6 | 3 | 9 | 3 | 6 |

FIG. 13

| fps<br>Size | 8000 | 6000 | 3000 | 1500 | 1200 | 800 | 400 | 160 | 103 | 60 |
|---|---|---|---|---|---|---|---|---|---|---|
| | | | | | Clock frequency(MHz) | | | | | |
| 1920x1080 | ✕ | ✕ | ✕ | ✕ | ✕ | ✕ | ✕ | ✕ | 277.4 | 161.6 |
| 854x480 | ✕ | ✕ | ✕ | ✕ | ✕ | ✕ | 213.9 | 85.6 | 55.1 | 32.1 |
| 640x480 | ✕ | ✕ | ✕ | ✕ | ✕ | ✕ | 158.4 | 63.4 | 40.8 | 23.8 |
| 640x360 | ✕ | ✕ | ✕ | ✕ | ✕ | 253.5 | 126.8 | 50.7 | 32.7 | 19.1 |
| 352x288 | ✕ | ✕ | ✕ | 196.1 | 156.9 | 104.6 | 52.3 | 21.0 | 13.5 | 7.9 |
| 320x240 | ✕ | ✕ | ✕ | 158.4 | 126.8 | 84.5 | 42.3 | 16.9 | 10.9 | 6.4 |
| 320x180 | ✕ | ✕ | 237.6 | 118.8 | 95.1 | 63.4 | 31.7 | 12.7 | 8.2 | 4.8 |
| 176x144 | ✕ | 217.8 | 108.9 | 54.5 | 43.6 | 29.1 | 14.6 | 5.9 | 3.8 | 2.2 |
| 160x128 | 211.2 | 158.4 | 79.2 | 39.6 | 31.7 | 21.2 | 10.6 | 4.3 | 2.8 | 1.6 |

IMAGE PROCESSOR

CROSS-REFERENCE TO RELATED APPLICATIONS

This application claims priority to Japanese Patent Application No. 2013-075270. The entire disclosure of Japanese Patent Application No. 2013-075270 is hereby incorporated herein by reference.

BACKGROUND OF THE INVENTION

Field of the Invention

The present invention relates to image processors, and more particularly, to a real-time encoder in an H.264 compression coding system.

Description of the Background Art

A video recorder of a background art is described in JP2010-272993A. In the video recorder, multiple video data sets input from a video input unit are stored in a frame buffer. An encoding unit encodes video data. An encoder control unit allots encoding time to each of the video data sets stored in the frame buffer. Then when time allotted to a currently target video data set of the encoding unit lapses, the target video data set is switched to the next set.

H.264 real-time encoders generally perform header processing by software processing employing, for example, a CPU, and perform macroblock processing by hardware processing employing, for example, a hardware accelerator. This is because software processing is effective for header processing as it can be flexibly adapted to various profiles and application programs, while hardware processing is effective for macroblock processing that involves huge amount of computing including a lot of repeated routine operations.

Encoding by both software processing and hardware processing, however, causes issuance of commands from a CPU to a hardware accelerator and notification signifying a completion of processing (interrupt notification) from a hardware accelerator to a CPU, every time processing of one picture is complete. Thus issuance of commands and interrupt notifications frequently occurs between the CPU and the hardware accelerator, and in consequence, the processing load of the CPU increases and waiting time is prolonged, resulting in a protracted time required for encoding as a whole.

SUMMARY OF THE INVENTION

It is an object of the present invention to provide an image processor that reduces the processing load of a software processing unit and shortens a time required for encoding, in comparison with issuance of commands and interrupt notifications for every picture.

According to an aspect of the present invention, an image processor includes a memory that stores a target picture for image processing, a software processing unit that performs image processing on a picture by software processing, and a hardware processing unit that performs image processing on a picture by hardware processing. The software processing unit has a multi mode as an operational mode of the hardware processing unit, the multi mode being a mode for encoding an input picture in a various way within a predetermined unit period specified based on a maximum computing power of the image processor so as to generate multiple output pictures that are different in at least one of a picture size and a frame rate. In the multi mode, the software processing unit notifies the hardware processing unit by batch of multiple settings information sets about multiple output pictures before the hardware processing unit starts to encode an input picture, and the hardware processing unit performs continuous encoding for the output pictures, based on the settings information sets notified of by the software processing unit, without a notification signifying a completion for every picture, and upon completion of encoding for all of the output pictures, sends an interrupt notification signifying a completion of encoding to the software processing unit.

In the image processor according to this aspect, in the multi mode, the software processing unit notifies the hardware processing unit by batch of multiple settings information sets about multiple output pictures before the hardware processing unit starts to encode an input picture. The hardware processing unit performs continuous encoding for the output pictures, based on the settings information sets notified of by the software processing unit, without a notification signifying a completion for every picture. Upon completion of encoding for all of the output pictures, an interrupt notification signifying a completion of encoding is sent to the software processing unit. In consequence, in performing multi-encoding of output pictures of multiple sequences having different picture sizes or frame rates, the processing load of the software processing unit is reduced and time required for encoding is shortened, in comparison with encoding involving issuance of commands and interrupt notifications between the software processing unit and the hardware processing unit for every picture.

Preferably in the image processor, the software processing unit sets a picture size and a frame rate of each of multiple output pictures, based on a maximum picture size and a frame rate corresponding to the maximum picture size processable by the image processor, and a use of the output pictures.

Thus effective utilization of the maximum computing power of the image processor and appropriate performance of multi-encoding are achieved.

Preferably in the image processor, with output pictures to be generated in multiple continuous predetermined unit periods being different in frame rates of the output pictures, the software processing unit notifies the hardware processing unit of information for identifying an output picture among multiple output pictures to be generated in each predetermined unit period along with the settings information sets.

Thus the hardware processing unit is capable of appropriately processing the output picture among multiple output pictures to be generated in each predetermined unit period, based on the settings information sets.

Preferably the hardware processing unit includes a coding circuit that codes an input picture, a NAL-forming circuit that forms the NAL for the picture coded by the coding circuit, and a control circuit that controls the coding circuit and the NAL-forming circuit. The settings information sets notified of by the software processing unit to the hardware processing unit is input to the NAL-forming circuit and the control circuit.

In this way, settings information required for multi-encoding is input to the NAL-forming circuit and the control circuit, so that appropriate performance of multi-encoding is achieved in the hardware processing unit.

Preferably, the settings information sets input to the NAL-forming circuit include header information to be used to form NAL for each output picture.

By inputting the header information required for forming the NAL of each output picture to the NAL coding circuit, the NAL for each output picture is formed appropriately in the NAL coding circuit.

Preferably the software processing unit further has a high-speed mode as an operational mode of the hardware processing unit, the high-speed mode being a mode for encoding an input picture so as to generate an output picture having a picture size smaller than a maximum picture size processable by the image processor and a frame rate higher than a frame rate corresponding to the maximum picture size. In the high-speed mode, the software processing unit notifies the hardware processing unit of settings information about output pictures before the hardware processing unit starts to encode an input picture, and the hardware processing unit performs continuous encoding for the output pictures, based on the settings information notified of by the software processing unit, without a notification signifying a completion for every picture, and upon completion of encoding for all of a specified number of the output pictures, sends an interrupt notification signifying a completion of encoding to the software processing unit.

In consequence, in performing encoding in the high-speed mode for generating an output picture having a small picture size and a high frame rate, the processing load of the software processing unit is reduced and time required for encoding is shortened, in comparison with encoding involving issuance of commands and interrupt notifications between the software processing unit and the hardware processing unit for every picture.

Preferably the software processing unit sets a maximum frame rate of an output picture, based on a maximum picture size and a frame rate corresponding to the maximum picture size processable by the image processor, a picture size of an output picture, and a maximum clock frequency of the hardware processing unit.

Thus effective utilization of the maximum computing power of the image processor and appropriate performance of high-speed encoding are achieved.

Preferably the software processing unit notifies the hardware processing unit of information about a specified number of output pictures to be generated by continuous encoding along with the settings information.

Thus the hardware processing unit is capable of appropriately processing the specified number of output pictures to be generated by continuous encoding in the high-speed encoding, based on the settings information.

Preferably hardware processing unit includes a coding circuit that codes an input picture, a NAL-forming circuit that forms the NAL for the picture coded by the coding circuit, and a control circuit that controls the coding circuit and the NAL-forming circuit. The settings information notified by the software processing unit to the hardware processing unit is input to the NAL-forming circuit and the control circuit.

In this way, settings information required for high-speed encoding is input to the NAL coding circuit and the encoding control circuit, so that appropriate performance of high-speed encoding is achieved in the hardware processing unit.

Preferably the settings information sets input to the NAL-forming circuit include header information to be used to form the NAL for output pictures.

By inputting the header information required for forming the NAL for each output picture to the NAL coding circuit, the NAL for each output picture is formed appropriately in the NAL coding circuit.

In performing multi-encoding of output pictures of multiple sequences having different picture sizes or frame rates, the present invention reduces the processing load of a software processing unit and shortens a time required for encoding, in comparison with encoding involving issuance of commands and interrupt notifications between the software processing unit and the hardware processing unit for every picture.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a chart illustrating an example of multiple sequences generated by the image processor.

FIG. 7 is a chart illustrating a first example of settings of picture sizes and frame rates of sequences.

FIG. 8 is a chart illustrating a second example of settings of picture sizes and frame rates of sequences.

FIG. 9 is a chart illustrating a third example of settings of picture sizes and frame rates of sequences.

FIG. 10 is a chart illustrating a relation of sequences to be encoded within the same predetermined unit period in the multi mode.

FIG. 11 is a chart illustrating the number of notifications signifying a completion to be issued in generating multiple sequences in the normal mode, for comparison with FIG. 10.

FIG. 13 is a chart illustrating a relation between a picture size and a frame rate.

DETAILED DESCRIPTION OF THE INVENTION

Description of the Preferred Embodiments

Figure 1:
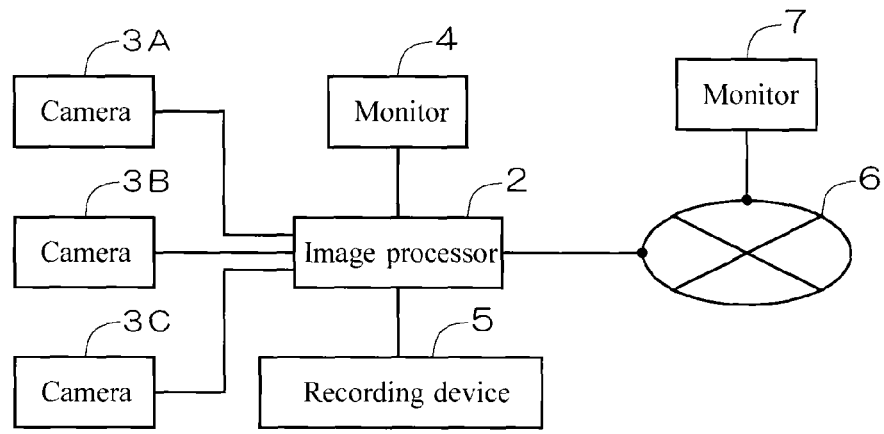
FIG. 1 is a diagram illustrating an overall configuration of a camera system according to an embodiment of the present invention.

Preferred embodiments of the present invention are described in detail below referring to the drawings. It should be noted that identical reference numerals throughout the drawings indicate identical or equivalent elements.

FIG. 1 is a diagram illustrating an overall configuration of a camera system 1 according to an embodiment of the present invention. The camera system 1 includes multiple cameras 3 (3A to 3C), an image processor 2 such as a real-time encoder connected to the cameras 3, a monitor 4 and a recording device 5 such as a hard disk drive connected to the image processor 2, and a monitor 7 connected to the image processor 2 via a communication network 6. For example, when the camera system 1 is used as a security camera system for guarding a certain facility, the cameras 3 are placed in an area to be monitored, the image processor 2, the monitor 4, and the recording device 5 are placed in a security office of the facility, and the monitor 7 is placed in a remote security company.

The image processor 2 encodes an image taken by the cameras 3 with the H.264 compression coding system. The image is recorded by the recording device 5 and also displayed by the monitor 4 in real time. The image is also transmitted to the security company via the communication network 6, and displayed by the monitor 7 in the security company.

Figure 2:
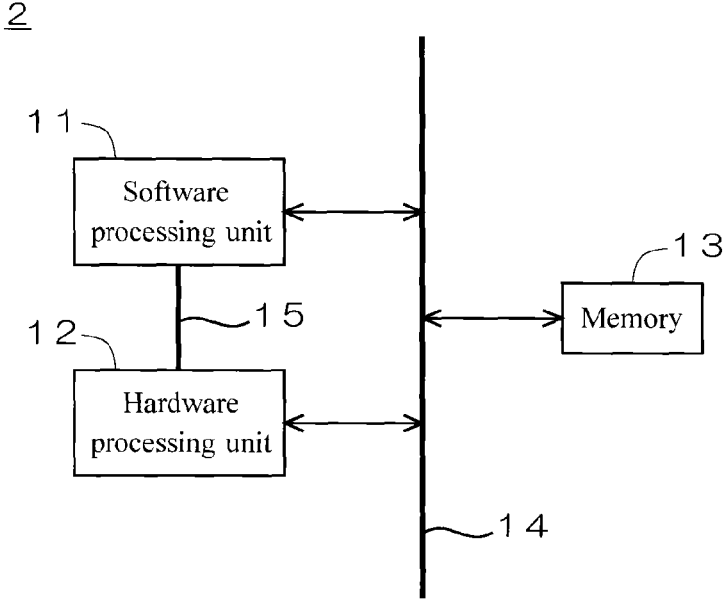
FIG. 2 is a simplified diagram illustrating a configuration of the image processor.

FIG. 2 is a simplified diagram illustrating a configuration of the image processor 2. The image processor 2 includes a memory 13 such as a DDR memory for storing a target picture of image processing, a software processing unit 11 such as a CPU that performs image processing on a picture by software processing, and a hardware processing unit 12 such as a hardware accelerator that performs image processing on a picture by hardware processing. The memory 13, the software processing unit 11, and the hardware processing unit 12 are connected to each other via a system bus 14. Furthermore, the software processing unit 11 and the hardware processing unit 12 are connected to each other via a register bus 15.

The software processing unit 11 notifies the hardware processing unit 12 of various information used for encoding an image. In response to an instruction by the software processing unit 11, the hardware processing unit 12 reads an image from the memory 13 and encodes the image. Upon completion of encoding, the hardware processing unit 12 notifies the software processing unit 11 of completion of encoding.

Figure 3:
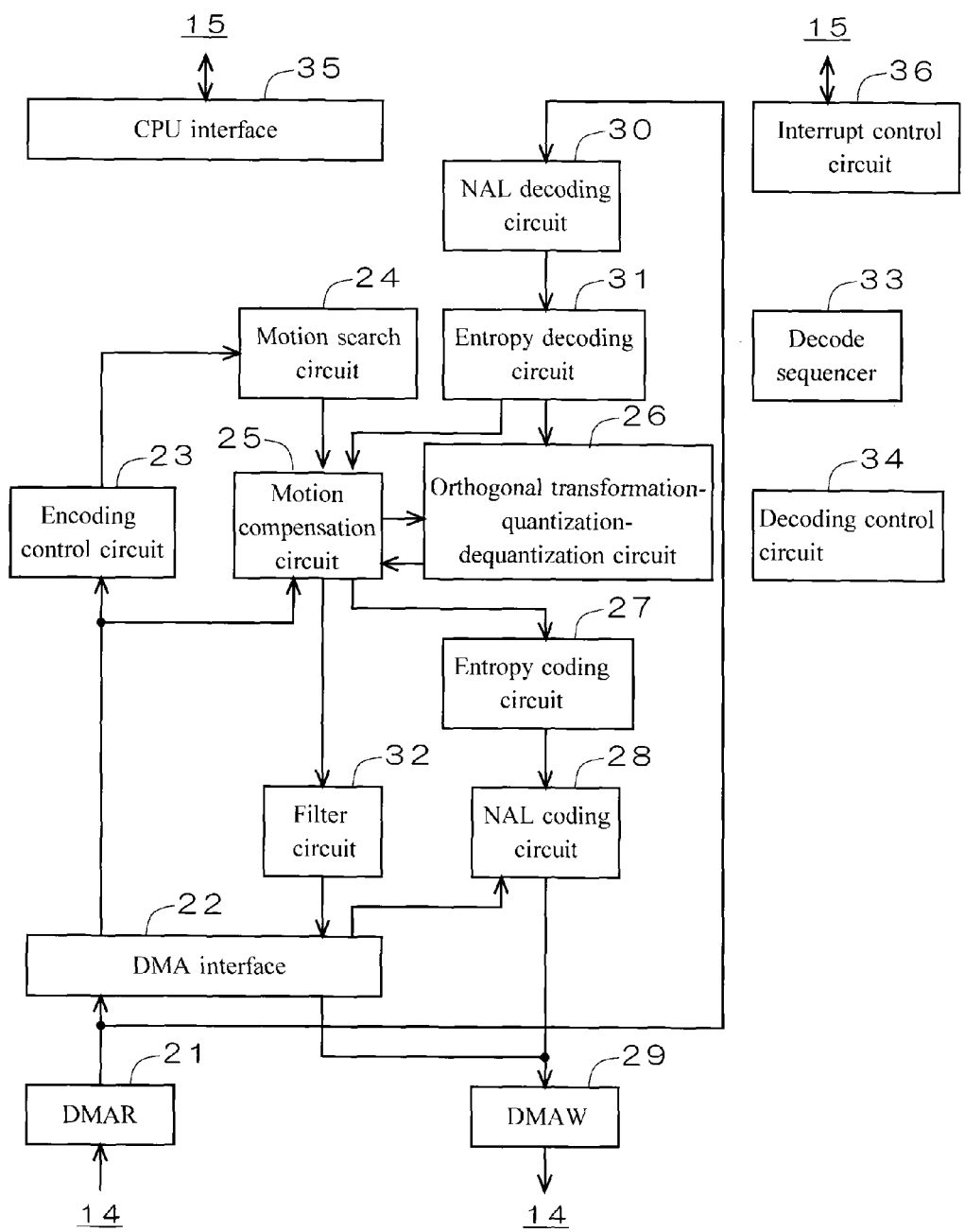
FIG. 3 is a diagram illustrating a configuration of a hardware processing unit.

FIG. 3 is a diagram illustrating a configuration of the hardware processing unit 12. FIG. 3 illustrates a relation of connection of the hardware processing unit 12 including a DMAR 21, a DMA interface 22, an encoding control circuit 23, a motion search circuit 24, a motion compensation circuit 25, an orthogonal transformation-quantization-dequantization circuit 26, an entropy coding circuit 27 such as a CABAC/CAVLC coding circuit, a NAL coding circuit 28, a DMAW 29, a NAL decoding circuit 30, an entropy decoding circuit 31 such as a CABAC/CAVLC decoding circuit, a filter circuit 32 such as a deblocking filter circuit, a decode sequencer 33, a decoding control circuit 34, a CPU interface 35, and an interrupt control circuit 36.

The DMAR 21 and the DMAW 29 connected to the memory 13 via the system bus 14. The CPU interface 35 and the interrupt control circuit 36 are connected to the software processing unit 11 via the register bus 15. Although not illustrated in the figure, the DMAR 21 and the DMAW 29 are connected to the software processing unit 11 via the register bus 15, and the CPU interface 35 is connected to the software processing unit 11 via the system bus 14.

Although the relation of connection is not illustrated in FIG. 3 for the sake of simplicity, the CPU interface 35 is connected to the DMAR 21, the DMAW 29, the encoding control circuit 23, the NAL coding circuit 28, the entropy coding circuit 27, and the decode sequencer 33. The interrupt control circuit 36 is connected to the encoding control circuit 23 and the decode sequencer 33. The decode sequencer 33 is connected to the encoding control circuit 23 and the interrupt control circuit 36. The decoding control circuit 34 is connected to the NAL decoding circuit 30, the entropy decoding circuit 31, the motion compensation circuit 25, the orthogonal transformation-quantization-dequantization circuit 26, and the filter circuit 32, and controls these circuits in decoding. The encoding control circuit 23 is connected to the interrupt control circuit 36, the motion search circuit 24, the motion compensation circuit 25, the orthogonal transformation-quantization-dequantization circuit 26, the filter circuit 32, the NAL coding circuit 28, and the entropy coding circuit 27, and controls these circuits in encoding.

In encoding, target image data is transferred through the DMAR 21, the DMA interface 22, the encoding control circuit 23, the motion search circuit 24, the motion compensation circuit 25, the orthogonal transformation-quantization-dequantization circuit 26, the entropy coding circuit 27, the NAL coding circuit 28, and the DMAW 29, so the image is encoded by pipelining.

In decoding, target image data is transferred through the DMAR 21, the NAL decoding circuit 30, the entropy decoding circuit 31, the orthogonal transformation-quantization-dequantization circuit 26, the motion compensation circuit 25, the filter circuit 32, the DMA interface 22, and the DMAW 29, so the image is decoded by pipelining.

In the image processor 2 of the present embodiment, settings by the software processing unit 11 enables arbitrary switching of operational modes of encoding of the hardware processing unit 12 (especially the NAL coding circuit 28) among three operational modes, namely, normal mode, multi mode, and high-speed mode.

In the normal mode, upon receipt of one instruction from the software processing unit 11, the hardware processing unit 12 encodes one picture. In every completion of encoding of one picture, the hardware processing unit 12 notifies the software processing unit 11 of a completion of encoding.

In the multi mode, upon receipt of one instruction from the software processing unit 11, the hardware processing unit 12 encodes multiple pictures of multiple sequences having different picture sizes or frame rates. In completion of encoding of all these pictures, the hardware processing unit 12 notifies the software processing unit 11 of a completion of encoding.

In the high-speed mode, upon receipt of one instruction from the software processing unit 11, the hardware processing unit 12 encodes multiple pictures of one sequence with a higher frame rate than in the normal mode. In completion of encoding of all these pictures, the hardware processing unit 12 notifies the software processing unit 11 of a completion of encoding.

The operational modes are described below.

<Normal Mode>

Figure 4:
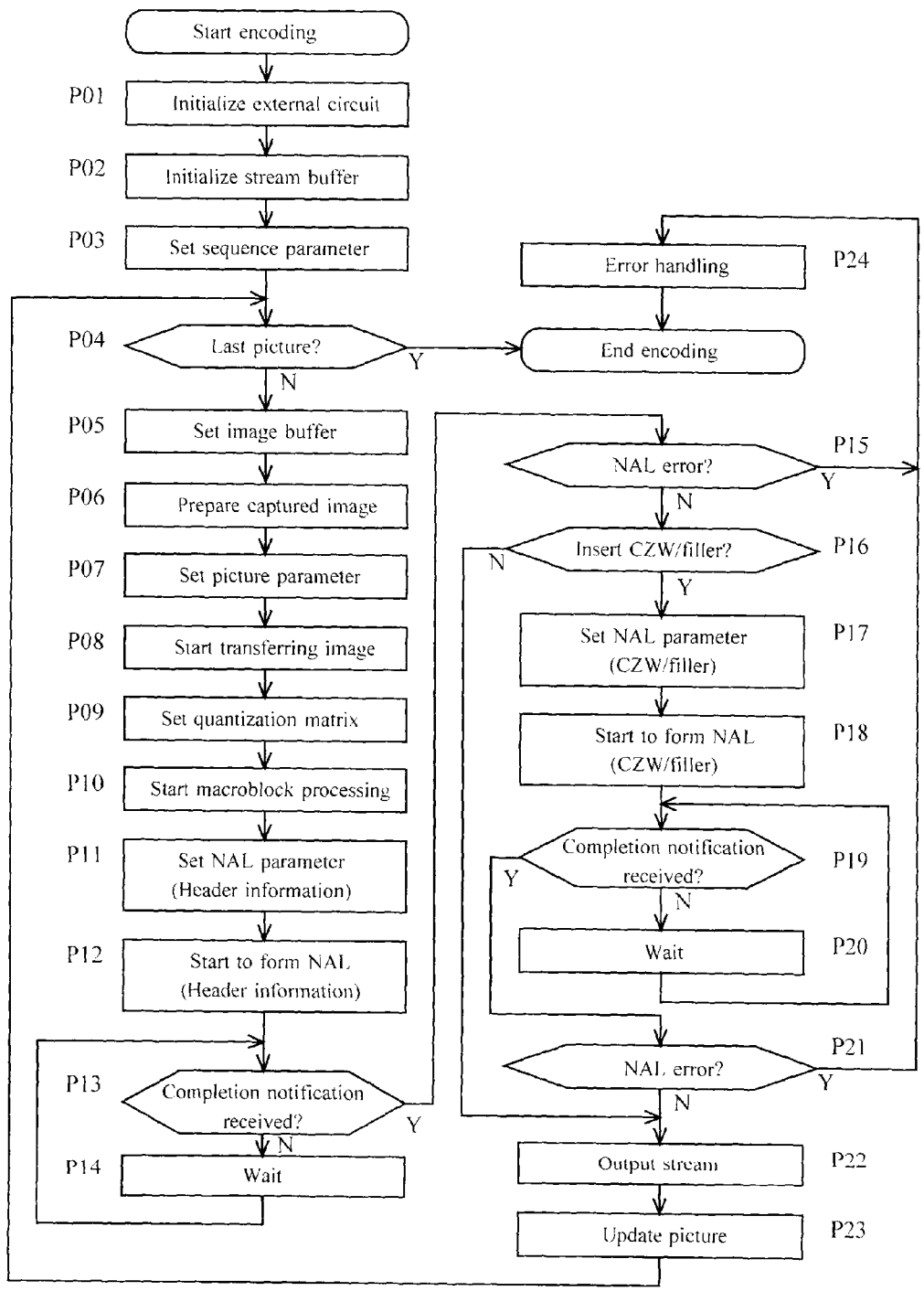
FIG. 4 is a flow chart illustrating a process flow of the image processor in the normal mode.

FIG. 4 is a flow chart illustrating a process flow of the image processor 2 in the normal mode.

In Step P01, the software processing unit 11 configures the settings of external circuits of the hardware processing unit 12. For example, a DMA controller not illustrated in the figure, and interrupt and clock control are initialized.

In Step P02, the software processing unit 11 initializes a stream buffer of the hardware processing unit 12. For example, the operational mode of a stream buffer in the NAL coding circuit 28 is selected from the ring buffer and linear buffer modes.

In Step P03, the software processing unit 11 sets a sequence parameter of the hardware processing unit 12. For example, a picture size, a rate control-related parameter, a quantization matrix, an entropy coding mode, and NAL header information are configured.

In Step P04, the software processing unit 11 determines whether a currently target picture is the last picture or not.

If not, in Step P05, the software processing unit 11 sets an image buffer of the hardware processing unit 12. For example, a captured image buffer, a local decoded image buffer, and a reference image buffer are configured.

In Step P06, the software processing unit 11 prepares a captured image in the memory 13 to serve as an input picture to the hardware processing unit 12.

In Step P07, the software processing unit 11 sets a picture parameter of the hardware processing unit 12. For example, basic information about a picture, and deblocking filter-related, motion search-related, and entropy coding-related settings are configured.

In Step P08, the software processing unit 11 instructs to start transferring the captured image and the reference image from the memory 13 to the hardware processing unit 12.

In Step P09, the software processing unit 11 sets a quantization matrix of the hardware processing unit 12 to be used for encoding of a next picture.

In Step P10, the software processing unit 11 instructs the hardware processing unit 12 to start macroblock processing.

In Step P11, the software processing unit 11 sets a parameter of header information required for forming the NAL in the hardware processing unit 12. For example, an effective bit length of header data and a position of a start byte of a header are configured. When operating the hardware processing unit 12 in the normal mode, header information to be used for encoding one picture is configured.

In Step P12, the software processing unit 11 instructs the hardware processing unit 12 to start to form the NAL for the header information.

In Steps P13 and P14, the software processing unit 11 waits to receive a notification signifying a completion of encoding from the hardware processing unit 12. The notification signifying a completion of encoding is input as an interrupt notification from the hardware processing unit 12 to the software processing unit 11.

Upon receipt of the notification signifying a completion, in Step P15, the software processing unit 11 analyzes a NAL error. For example, presence or absence of a buffer full error in a stream buffer is analyzed.

If there is a NAL error, in Step P24, the software processing unit 11 ends encoding by a predetermined error handling. Alternatively, the processes in Step P04 and subsequent steps may be redone with an increased buffer size.

If there is no NAL error, in Step P16, the software processing unit 11 determines whether cabac_zero_word (CZW) and/or filler data needs to be inserted. For example, information about a generated amount of code of a stream at that time is obtained from the hardware processing unit 12, so that whether the CZW and/or filler data needs to be insert is determined based on the generated amount of code.

If CZW and/or filler data needs to be inserted, in Step P17, the software processing unit 11 sets a parameter of the CZW and/or filler data required for forming the NAL in the hardware processing unit 12. For example, the size of the CZW and/or filler data to be inserted is configured.

In Step P18, the software processing unit 11 instructs the hardware processing unit 12 to start to form the NAL for the CZW and/or filler data.

In Steps P19 and P20, the software processing unit 11 waits to receive a notification signifying a completion of encoding from the hardware processing unit 12. The notification signifying a completion of encoding is input as an interrupt notification from the hardware processing unit 12 to the software processing unit 11.

Upon receipt of the notification signifying a completion, in Step P21, the software processing unit 11 analyzes a NAL error. For example, presence or absence of a buffer full error in a stream buffer is analyzed.

If there is a NAL error, in Step P24, the software processing unit 11 ends encoding by a predetermined error handling. Alternatively, the processes in Step P04 and subsequent steps may be redone with an increased buffer size.

If there is no NAL error, in Step P22, the software processing unit 11 outputs a NAL stream which has been written by the hardware processing unit 12 in the memory 13 after completion of encoding from the memory 13.

In Step P23, the software processing unit 11 increments a counter for an encoded picture by one, and then perform the determination in Step P04. Hence the above processes are repeated until encoding of a predetermined number of pictures is complete. Then with completion of encoding of the last picture, the processing ends.

Figure 5:
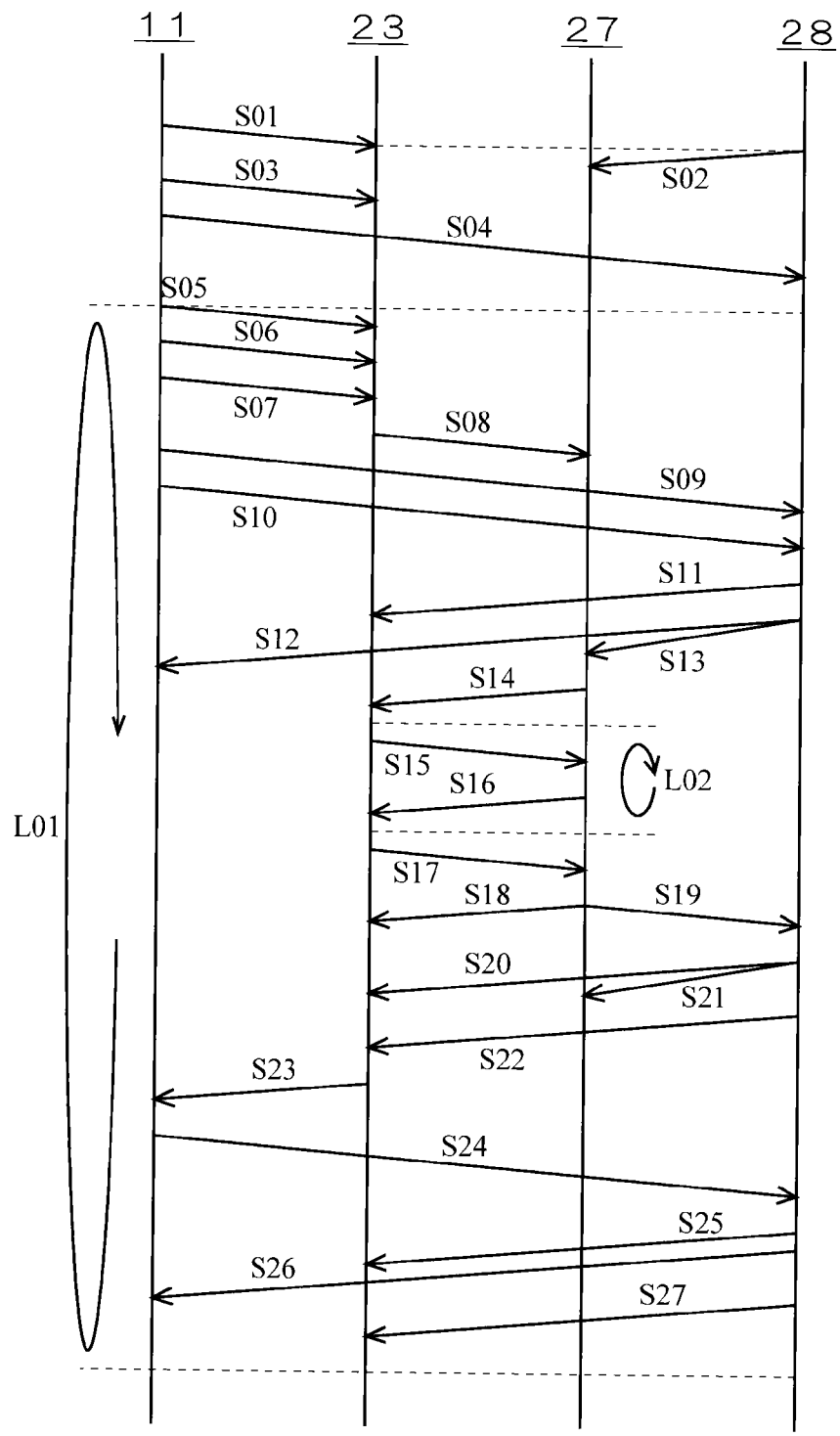
FIG. 5 is a diagram illustrating a control sequence in the image processor in the normal mode.

FIG. 5 is a diagram illustrating a control sequence in the image processor 2 in the normal mode.

The software processing unit 11 firstly inputs a reset signal S01 for resetting settings information of various registers to an initialized state to the encoding control circuit 23.

Then the NAL coding circuit 28 inputs a wait signal S02 to the entropy coding circuit 27.

The software processing unit 11 inputs an initialization signal S03 including, for example, the settings information described in the above Steps P03, P05, and P07 to the encoding control circuit 23.

The software processing unit 11 inputs an initialization signal S04 of the stream buffer described in the above Step P02 to the NAL coding circuit 28.

The software processing unit 11 inputs a command S05 to start transferring the image from the memory 13 to the hardware processing unit 12 described in the above Step P08 to the encoding control circuit 23.

The software processing unit 11 inputs a setting signal S06 of the quantization matrix described in the above Step P09 to the encoding control circuit 23.

The software processing unit 11 inputs a command S07 to start macroblock processing described in the above Step P10 to the encoding control circuit 23.

The encoding control circuit 23 inputs a signal S08 to start entropy coding of a macroblock to the entropy coding circuit 27. Hence the entropy coding circuit 27 starts entropy coding of the macroblock.

The software processing unit 11 inputs a setting signal S09 of the header information described in the above Step P11 to the NAL coding circuit 28.

The software processing unit 11 inputs a command S10 to start to form the NAL for the header information described in the above Step P12 to the NAL coding circuit 28.

The NAL coding circuit 28 inputs a clock start signal S11 of the NAL coding circuit 28 to the encoding control circuit 23. Hence the NAL coding circuit 28 starts to form the NAL as described in the above Step P12.

Upon completion of forming of the NAL for the header information, the NAL coding circuit 28 input a NAL-forming completion signal S12 of the header information to the software processing unit 11. The NAL coding circuit 28 also inputs a wait-canceling signal S13 to the entropy coding circuit 27. Hence the data of a macroblock is input from the entropy coding circuit 27 to the NAL coding circuit 28, and the NAL coding circuit 28 forms the NAL for the data of the macroblock.

The entropy coding circuit 27 inputs a completion signal S14 of entropy coding of the macroblock to the encoding control circuit 23.

The encoding control circuit 23 inputs a signal S15 to start entropy coding of a next macroblock to the entropy coding circuit 27. Upon completion of entropy coding of the macroblock, the entropy coding circuit 27 inputs a completion signal S16 of entropy coding of the macroblock to the encoding control circuit 23. As indicated by the loop L02 in the figure, the encoding control circuit 23 repeats the same processes until entropy coding of all macroblocks in the picture is complete.

The encoding control circuit 23 inputs a signal S17 to start entropy coding of the last macroblock to the entropy coding circuit 27. Upon completion of entropy coding of the macroblock, the entropy coding circuit 27 inputs a completion signal S18 of entropy coding of the macroblock to the encoding control circuit 23. The entropy coding circuit 27 also inputs a signal S19 signifying the last macroblock in the picture to the NAL coding circuit 28.

Upon completion of forming of the NAL for slice data of the last macroblock, the NAL coding circuit 28 inputs a clock stop signal S20 of the NAL coding circuit 28 to the encoding control circuit 23. The NAL coding circuit 28 also inputs a weight setting signal S21 to the entropy coding circuit 27.

The NAL coding circuit 28 inputs a NAL-forming completion signal S22 signifying completion of forming the NAL for slice data of one picture to the encoding control circuit 23.

The encoding control circuit 23 inputs a notification S23 signifying a completion of encoding described in the above Step P13 to the software processing unit 11.

If CZW and/or filler data needs to be inserted as described in the above Steps P16 to P21, the software processing unit 11 inputs a command S24 to start to form the NAL for the CZW and/or filler data described in the above Step P18 to the NAL coding circuit 28.

The NAL coding circuit 28 inputs a clock start signal S25 of the NAL coding circuit 28 to the encoding control circuit 23. Hence the NAL coding circuit 28 starts to form the NAL as described in the above Step P18.

Upon completion of forming the NAL for the CZW and/or filler data, the NAL coding circuit 28 inputs a NAL-forming completion signal S26 of the CZW and/or filler data to the software processing unit 11.

The NAL coding circuit 28 inputs a clock stop signal S20 of the NAL coding circuit 28 to the encoding control circuit 23.

As indicated by the loop L01 in the figure, the same processes as described above are repeated until forming the NAL for all target pictures is complete.

<Multi Mode>

Referring to FIG. 1, an image output from the image processor 2 serves a variety of uses such as recording in the recording device 5 and display in the monitors 4 and 7. Thus in the multi mode, the image processor 2 performs real-time encoding on images taken by the cameras 3 (that is, input pictures to the image processor 2) simultaneously in parallel, so as to output multiple sequences (that is, output pictures from the image processor 2) having different picture sizes or frame rates depending on the uses.

In an example of the present embodiment, the image processor 2 is assumed to be capable of processing an image having a picture size of 1920×1080 pixels and a frame rate of 103 fps at its maximum computing power (maximum arithmetic capacity). With such a capacity, the image processor 2 is capable of processing 840480 macroblocks per second. The image processor 2 shares the maximum computing power in generating multiple sequences, so as to realize real-time encoding of the multiple sequences.

FIG. 6 is a chart illustrating an example of multiple sequences generated by the image processor 2. By sharing the maximum computing power of a picture size of 1920×1080 pixels and a frame rate of 103 fps, the image processor 2 is capable of generating a total of nine sequences including three sequences for recording in the recording device 5 respectively having a picture size of 1920×1080 pixels and a frame rate of 30 fps, a picture size of 640×480 pixels and a frame rate of 30 fps, and a picture size of 320×240 pixels and a frame rate of 30 fps, three sequences for delivery at a high rate (for example, for display in the monitor 4) respectively having a picture size of 1920×1080 pixels and a frame rate of 30 fps, a picture size of 640×480 pixels and a frame rate of 30 fps, and a picture size of 320×240 pixels and a frame rate of 30 fps, and three sequences for delivery at a low rate (for example, for display in the monitor 7) respectively having a picture size of 1920×1080 pixels and a frame rate of 10 fps, a picture size of 640×480 pixels and a frame rate of 10 fps, and a picture size of 320×240 pixels and a frame rate of 10 fps.

The picture sizes and the frame rates of the sequences are configured by the software processing unit 11. The software processing unit 11 sets the picture sizes and the frame rates of the sequences so that the total computing power shared among the multiple sequences is equal to or below the maximum computing power of the image processor 2, based on the maximum computing power of the image processor 2 and the uses of the sequences specified by a user.

FIG. 7 is a chart illustrating a first example of settings of picture sizes and frame rates of sequences. The sequences include three sequences SEQ00 to SEQ02 for recording in the recording device 5, respectively having a picture size of 1920×1080 pixels, 640×360 pixels, and 320×180 pixels, and all having a frame rate of 30 fps, three sequences SEQ10 to SEQ12 for delivery at a high rate, respectively having a picture size of 1920×1080 pixels, 640×360 pixels, and 320×180 pixels, and all having a frame rate of 15 fps, and three sequences SEQ20 to SEQ22 for delivery at a low rate, respectively having a picture size of 1920×1080 pixels, 640×360 pixels, and 320×180 pixels, and all having a frame rate of 10 fps.

FIG. 8 is a chart illustrating a second example of settings of picture sizes and frame rates of sequences. The sequences include three sequences SEQ00 to SEQ02 for recording in the recording device 5, respectively having a picture size of 1920×1080 pixels, 640×360 pixels, and 320×180 pixels, and all having a frame rate of 30 fps, three sequences SEQ10 to SEQ12 for delivery at a high rate, respectively having a picture size of 1920×1080 pixels, 320×180 pixels, and 320×180 pixels, and all having a frame rate of 30 fps, and three sequences SEQ20 to SEQ22 for delivery at a low rate, respectively having a picture size of 1920×1080 pixels, 640×360 pixels, and 320×180 pixels, and all having a frame rate of 10 fps.

FIG. 9 is a chart illustrating a third example of settings of picture sizes and frame rates of sequences. The sequences include three sequences SEQ00 to SEQ02 for recording in the recording device 5, respectively having a picture size of 1920×1080 pixels, 640×360 pixels, and 320×180 pixels, and all having a frame rate of 30 fps, three sequences SEQ10 to SEQ12 for delivery at a high rate, respectively having a picture size of 1280×720 pixels, 320×180 pixels, and 320×180 pixels, and all having a frame rate of 30 fps, and three sequences SEQ20 to SEQ22 for delivery at a low rate, respectively having a picture size of 1280×720 pixels, 640×360 pixels, and 320×180 pixels, and all having a frame rate of 30 fps.

In the multi mode as described above, the maximum computing power of the image processor 2 is shared so that encoding to generate the multiple sequences SEQ00 to SEQ02, SEQ10 to SEQ12, and SEQ20 to SEQ22 is performed in parallel.

FIG. 10 is a chart illustrating a relation of sequences to be encoded within the same predetermined unit period in the multi mode. The predetermined unit period is a time period for encoding per picture (vertical synchronization period) with respect to the sequence having the highest frame rate among multiple sequences processed in multi-encoding. Here, the first example illustrated in FIG. 7 is employed with the highest frame rate of 30 fps, which leads to vertical synchronization periods V1 to V9 of 33 ms.

Since the sequences SEQ00 to SEQ02 have a frame rate of 30 fps, encoding is performed in all vertical synchronization periods V1 to V9. Since the sequences SEQ10 to SEQ12 have a frame rate of 15 fps, encoding is performed in the vertical synchronization periods V1, V3, V5, V7, and V9. Since the sequences SEQ20 to SEQ22 have a frame rate of 10 fps, encoding is performed in the vertical synchronization periods V1, V4, and V7. In consequence, encoding is performed on nine pictures in the vertical synchronization period V1, three pictures in the vertical synchronization period V2, six pictures in the vertical synchronization period V3, six pictures in the vertical synchronization period V4, six pictures in the vertical synchronization period V5, three pictures in the vertical synchronization period V6, nine pictures in the vertical synchronization period V7, three pictures in the vertical synchronization period V8, and six pictures in the vertical synchronization period V9.

In the above normal mode, the commands S05, S07, and S10 from the software processing unit 11 to the hardware processing unit 12 and the notification signifying a completion of encoding S23 from the hardware processing unit 12 to the software processing unit 11 is issued every time processing of one picture is complete. Thus during each of the vertical synchronization periods V1 to V9, to the number of each of the commands S05, S07, and S10 and the notification signifying a completion S23 to be issued is equal to the number of pictures to be encoded. Thus in the multi mode, during each of the vertical synchronization periods V1 to V9, the hardware processing unit 12 processes multiple pictures continuously, without the commands S05, S07, and S10 and the notification signifying a completion S23 for every picture. Hence as illustrated in FIG. 10, the notification signifying a completion S23 is issued only once during each of the vertical synchronization periods V1 to V9, which results in sufficient reduction of interrupt notifications.

FIG. 11 is a chart illustrating the number of notifications signifying a completion to be issued in generating multiple sequences in the normal mode, for comparison with FIG. 10. In the normal mode, the notification signifying a completion S23 is issued nine times in the vertical synchronization period V1, three times in the vertical synchronization period V2, six times in the vertical synchronization period V3, six times in the vertical synchronization period V4, six times in the vertical synchronization period V5, three times in the vertical synchronization period V6, nine times in the vertical synchronization period V7, three times in the vertical synchronization period V8, and six times in the vertical synchronization period V9.

Figure 12:
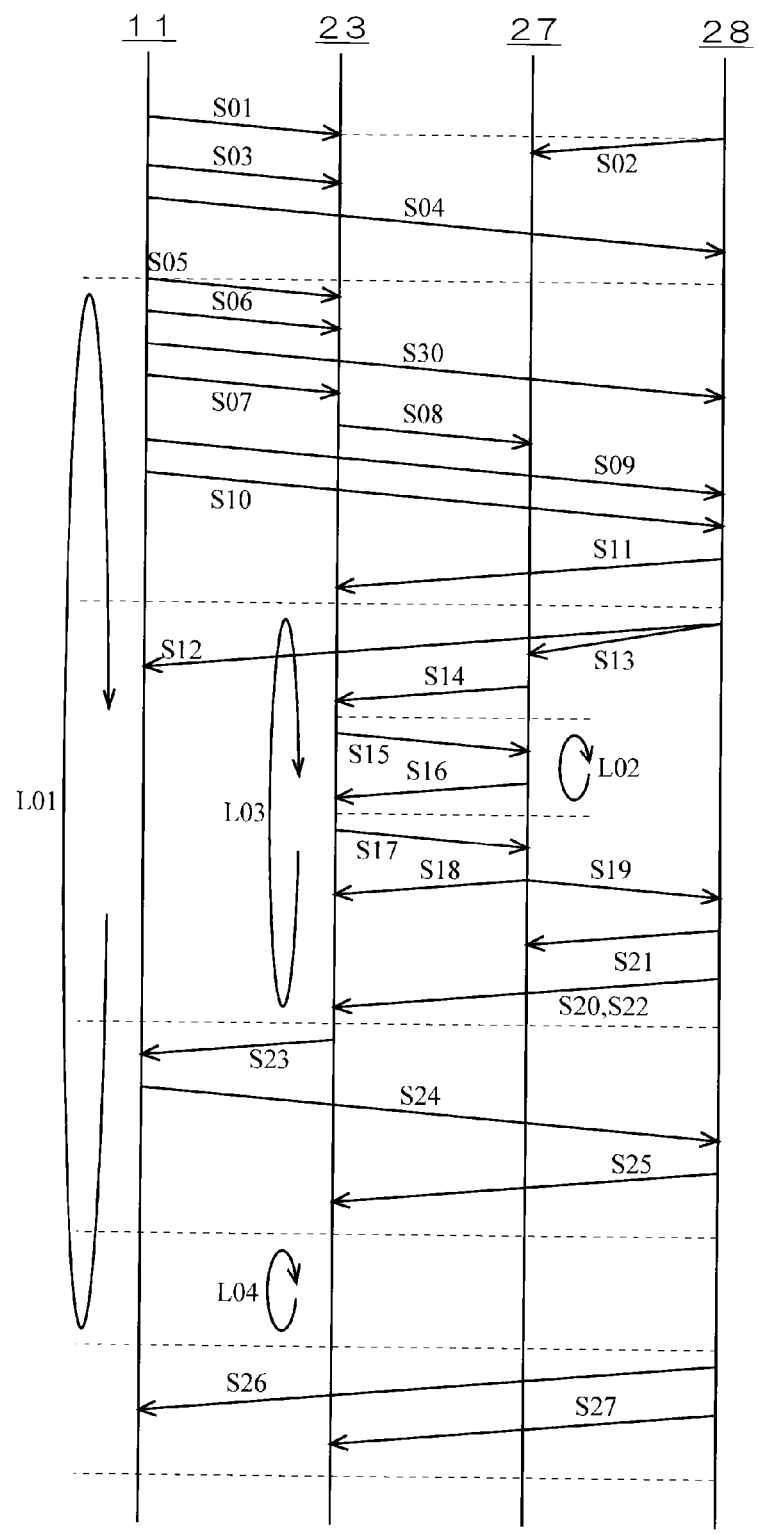
FIG. 12 is a diagram illustrating a control sequence in the image processor 2 in the multi mode.

FIG. 12 is a diagram illustrating a control sequence in the image processor 2 in the multi mode.

The software processing unit 11 firstly inputs a reset signal S01 for resetting settings information of various registers to an initialized state to the encoding control circuit 23.

Then the NAL coding circuit 28 inputs a wait signal S02 to the entropy coding circuit 27.

The software processing unit 11 inputs an initialization signal S03 including, for example, the settings information described in the above Steps P03, P05, and P07 to the encoding control circuit 23. In the multi mode, the initialization signal S03 includes information for identifying multiple sequences to be encoded in each of the vertical synchronization periods. Also in the multi mode, the linear buffer mode is selected as the operational mode of a stream buffer in the NAL coding circuit 28.

The software processing unit 11 inputs an initialization signal S04 of the stream buffer described in the above Step P02 to the NAL coding circuit 28.

The software processing unit 11 inputs a command S05 to start transferring the image from the memory 13 to the hardware processing unit 12 described in the above Step P08 to the encoding control circuit 23. In the multi mode, all captured images to be encoded in each of the vertical synchronization periods are prepared in the memory 13.

The software processing unit 11 inputs a setting signal S06 of the quantization matrix described in the above Step P09 to the encoding control circuit 23.

The software processing unit 11 inputs a setting signal S30 to instruct the NAL coding circuit 28 to operate in the multi mode to the NAL coding circuit 28.

The software processing unit 11 inputs a command S07 to start macroblock processing described in the above Step P10 to the encoding control circuit 23.

The encoding control circuit 23 inputs a signal S08 to start entropy coding of a macroblock to the entropy coding circuit 27. Hence the entropy coding circuit 27 starts entropy coding of the macroblock.

The software processing unit 11 inputs a setting signal S09 of the header information described in the above Step P11 to the NAL coding circuit 28. In the multi mode, header information about all pictures to be encoded in each of the vertical synchronization periods is input to the NAL coding circuit 28 by batch.

The software processing unit 11 inputs a command S10 to start to form the NAL for the header information described in the above Step P12 to the NAL coding circuit 28.

The NAL coding circuit 28 inputs a clock start signal S11 of the NAL coding circuit 28 to the encoding control circuit 23. Hence the NAL coding circuit 28 starts to form the NAL as described in the above Step P12.

Upon completion of forming of the NAL for the header information, the NAL coding circuit 28 input a NAL-forming completion signal S12 of the header information to the software processing unit 11. In the multi mode, the NAL-forming completion signal S12 is input to the software processing unit 11, only when forming of the NAL for the header information about the last picture to be encoded in each of the vertical synchronization periods is complete.

The NAL coding circuit 28 also inputs a wait-canceling signal S13 to the entropy coding circuit 27. Hence the data of a macroblock is input from the entropy coding circuit 27 to the NAL coding circuit 28, and the NAL coding circuit 28 forms the NAL for the data of the macroblock.

The entropy coding circuit 27 inputs a completion signal S14 of entropy coding of the macroblock to the encoding control circuit 23.

The encoding control circuit 23 inputs a signal S15 to start entropy coding of a next macroblock to the entropy coding circuit 27. Upon completion of entropy coding of the macroblock, the entropy coding circuit 27 inputs a completion signal S16 of entropy coding of the macroblock to the encoding control circuit 23. As indicated by the loop L02 in the figure, the encoding control circuit 23 repeats the same processes until entropy coding of all macroblocks in the picture is complete.

The encoding control circuit 23 inputs a signal S17 to start entropy coding of the last macroblock to the entropy coding circuit 27. Upon completion of entropy coding of the macroblock, the entropy coding circuit 27 inputs a completion signal S18 of entropy coding of the macroblock to the encoding control circuit 23. The entropy coding circuit 27 also inputs a signal S19 signifying the last macroblock in the picture to the NAL coding circuit 28.

Upon completion of forming of the NAL for slice data of the last macroblock, the NAL coding circuit 28 inputs a clock stop signal S20 of the NAL coding circuit 28 to the encoding control circuit 23. In the multi mode, the clock stop signal S20 is input to the software processing unit 11, only when forming of the NAL for the slice data of the last picture to be encoded in each of the vertical synchronization periods is complete.

The NAL coding circuit 28 also inputs a weight setting signal S21 to the entropy coding circuit 27.

The NAL coding circuit 28 inputs a NAL-forming completion signal S22 signifying completion of forming the NAL for slice data of one picture to the encoding control circuit 23.

The encoding control circuit 23 starts entropy coding of a next picture, and when forming the NAL for slice data of the picture is complete, the NAL-forming completion signal S22 is input from the NAL coding circuit 28 to the encoding control circuit 23 again. As indicated by the loop L03 in the figure, the encoding control circuit 23 repeats the same processes until forming the NAL for slice data of all pictures to be encoded in each of the vertical synchronization periods is complete.

The encoding control circuit 23 inputs a notification S23 signifying a completion of encoding described in the above Step P13 to the software processing unit 11.

If CZW and/or filler data needs to be inserted as described in the above Steps P16 to P21, the software processing unit 11 inputs a command S24 to start to form the NAL for the CZW and/or filler data described in the above Step P18 to the NAL coding circuit 28.

The NAL coding circuit 28 inputs a clock start signal S25 of the NAL coding circuit 28 to the encoding control circuit 23. Hence the NAL coding circuit 28 starts to form the NAL as described in the above Step P18.

Upon completion of forming the NAL for the CZW and/or filler data, the NAL coding circuit 28 inputs a NAL-forming completion signal S26 of the CZW and/or filler data to the software processing unit 11. As indicated by the loop L03 in the figure, the NAL coding circuit 28 repeats the same processes until forming the NAL for the CZW and/or filler data of all pictures to be encoded in each of the vertical synchronization periods is complete.

The NAL coding circuit 28 inputs a clock stop signal S20 of the NAL coding circuit 28 to the encoding control circuit 23. In the multi mode, the clock stop signal S27 is input to the software processing unit 11, only when forming of the NAL for the CZW and/or filler data of the last picture to be encoded in each of the vertical synchronization periods is complete.

FIG. 12 illustrates a non-limiting example of completing forming the NAL for slice data of all pictures to be encoded in each of the vertical synchronization periods, and then forming the NAL for the CZW and/or filler data of all the pictures together. Unlike the above example, completing forming the NAL for slice data of each picture to be encoded in each of the vertical synchronization periods, and then forming the NAL for the CZW and/or filler data of the picture is possible.

As indicated by the loop L01 in the figure, the same processes as described above are repeated until forming the NAL for all target pictures is complete.

As described above, when the operational mode of the hardware processing unit 12 is the multi mode, the software processing unit 11 notifies the hardware processing unit 12 by batch of multiple settings information sets about multiple output pictures (such as header information for all pictures to be encoded in each of the vertical synchronization periods) before the hardware processing unit 12 starts to encode an input picture. The hardware processing unit 12 performs continuous encoding for multiple output pictures, based on multiple settings information sets notified of by the software processing unit 11, without a notification signifying a completion for every picture. Upon completion of encoding for all of the multiple output pictures, the software processing unit 11 receives an interrupt notification signifying a completion of encoding S23. In consequence, in performing multi-encoding of output pictures of multiple sequences having different picture sizes or frame rates, the processing load of the software processing unit 11 is reduced and time required for encoding is shortened, in comparison with encoding involving issuance of commands and interrupt notifications between the software processing unit 11 and the hardware processing unit 12 for every picture.

The software processing unit 11 sets a picture size and a frame rate of each of multiple output pictures, based on a maximum picture size and a frame rate corresponding to the maximum picture size processable by the image processor 2, and a use of the output pictures. Thus effective utilization of the maximum computing power of the image processor 2 and appropriate performance of multi-encoding are achieved.

The software processing unit 11 notifies the hardware processing unit 12 of information for identifying an output picture among multiple output pictures to be generated in each predetermined unit period along with the initialization signal S03 (settings information). Thus the hardware processing unit 12 is capable of appropriately processing the output picture among multiple output pictures to be generated in each predetermined unit period, based on the initialization signal S03.

The settings information notified of by the software processing unit 11 to the hardware processing unit 12 is input to the NAL coding circuit 28 (NAL-forming circuit) and the encoding control circuit 23 (control circuit). In this way, settings information required for multi-encoding is input to the NAL coding circuit 28 and the encoding control circuit 23, so that appropriate performance of multi-encoding is achieved in the hardware processing unit 12.

<High-Speed Mode>

Similar to the above, the image processor 2 is assumed to be capable of processing an image having a picture size of 1920×1080 pixels and a frame rate of 103 fps at its maximum computing power. A clock speed required for encode one 1 macroblock is assumed to be 330 cycles. On such assumption, processing an image having a picture size of 1920×1080 pixels and a frame rate of 103 fps requires the hardware processing unit 12 for a clock frequency of 278 MHz.

Thus in the high-speed mode, an image having a frame rate higher than 103 fps is processed with the upper limit for the clock frequency of the hardware processing unit 12 being 278 MHz and the picture size smaller than 1920×1080 pixels.

FIG. 13 is a chart illustrating a relation between a picture size and a frame rate. For example, since a clock frequency required for processing an image having a picture size of 640×480 pixels and a frame rate of 160 fps is 63.4 MHz, which is lower than the upper limit of 278 MHz, the image is processed with the computing power of the image processor 2. The items marked with x instead of a clock frequency correspond to an area where the clock frequency exceeds the upper limit of 278 MHz.

According to FIG. 13, for a picture size of 1920×1080 pixels, a maximum frame rate is 103 fps, for a picture size of 854×480 pixels, a maximum frame rate is 400 fps, for a picture size of 640×480 pixels, a maximum frame rate is 400 fps, for a picture size of 640×360 pixels, a maximum frame rate is 800 fps, for a picture size of 352×288 pixels, a maximum frame rate is 1500 fps, for a picture size of 320×240 pixels, a maximum frame rate is 1500 fps, for a picture size of 320×180 pixels, a maximum frame rate is 3000 fps, for a picture size if 176×144, a maximum frame rate is 6000 fps, and for a picture size of 160×128 pixels, a maximum frame rate is 8000 fps.

The maximum frame rate of each picture size is configured by the software processing unit 11. The software processing unit 11 sets a maximum frame rate of an output picture, based on a maximum picture size (1920×1080 pixels) and a frame rate (103 fps) corresponding to the maximum picture size processable by the image processor 2, a picture size of the output picture, and an upper limit (278 MHz) of the clock frequency of the hardware processing unit 12.

In the above-described normal mode, the commands S05, S07, and S10 from the software processing unit 11 to the hardware processing unit 12 and the notification signifying a completion of encoding S23 from the hardware processing unit 12 to the software processing unit 11 are issued every time processing of one picture is complete. Thus processing an image having a high frame rate involves increase in issuance of the commands S05, S07, and S10 and the notifications signifying a completion S23, proportionately with the frame rate. To solve this problem, in the high-speed mode, a specified number (for example, 255 for GOP of 15, and 240 for GOP of 30) pictures are processed continuously, without the commands S05, S07, and S10 and the notification signifying a completion S23 for every picture within the specified number of pictures. Hence the interrupt notifications are sufficiently reduced.

Figure 14:
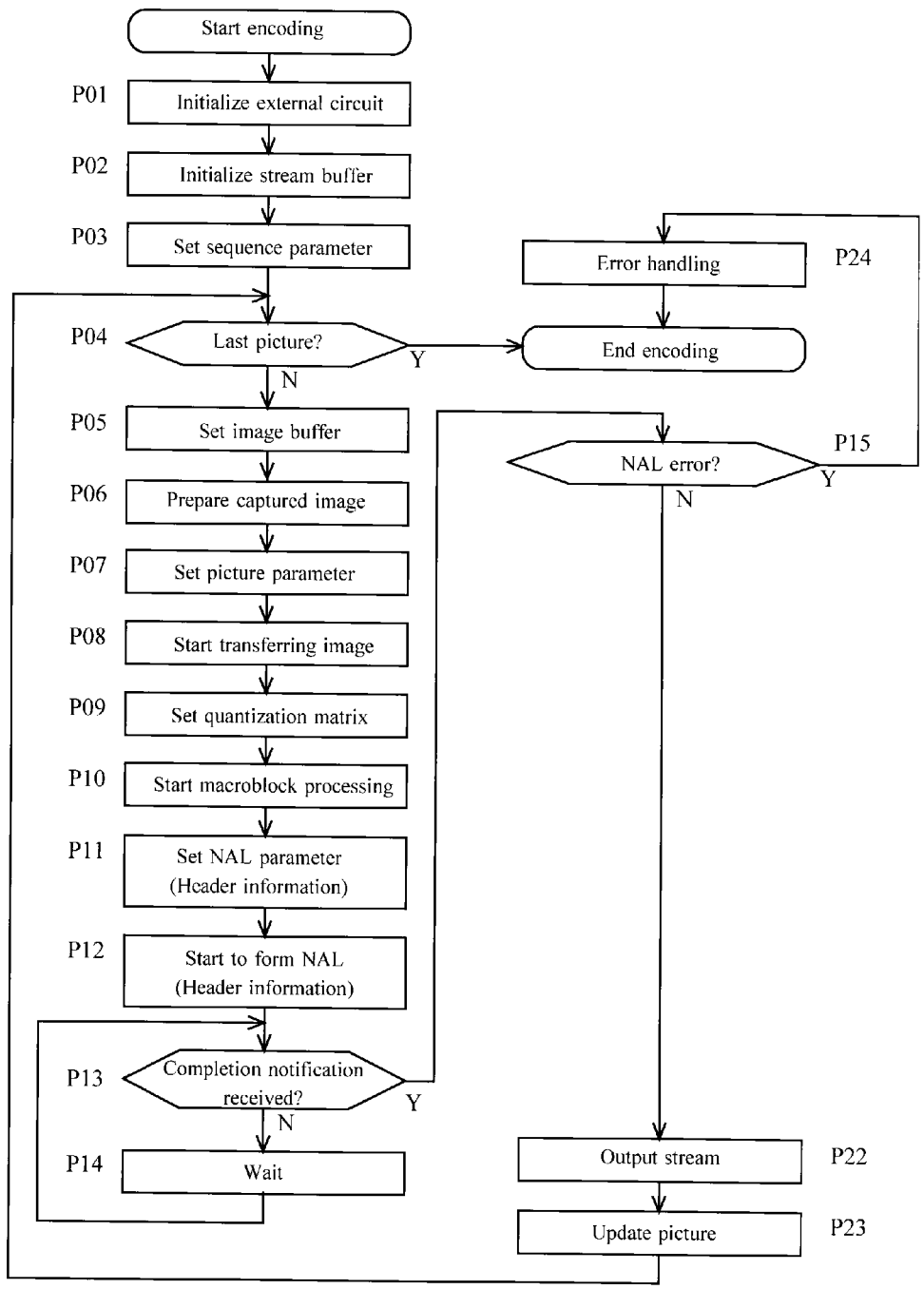
FIG. 14 is a flow chart illustrating a process flow of the image processor in the high-speed mode.

FIG. 14 is a flow chart illustrating a process flow of the image processor 2 in the high-speed mode. As illustrated in FIG. 4, the difference from the normal mode is that insertion of the CZW and/or filler data in Steps P16 to P21 is omitted to reduce the processing load. Since the other processes are the same as in FIG. 4, description is not repeated.

Figure 15:
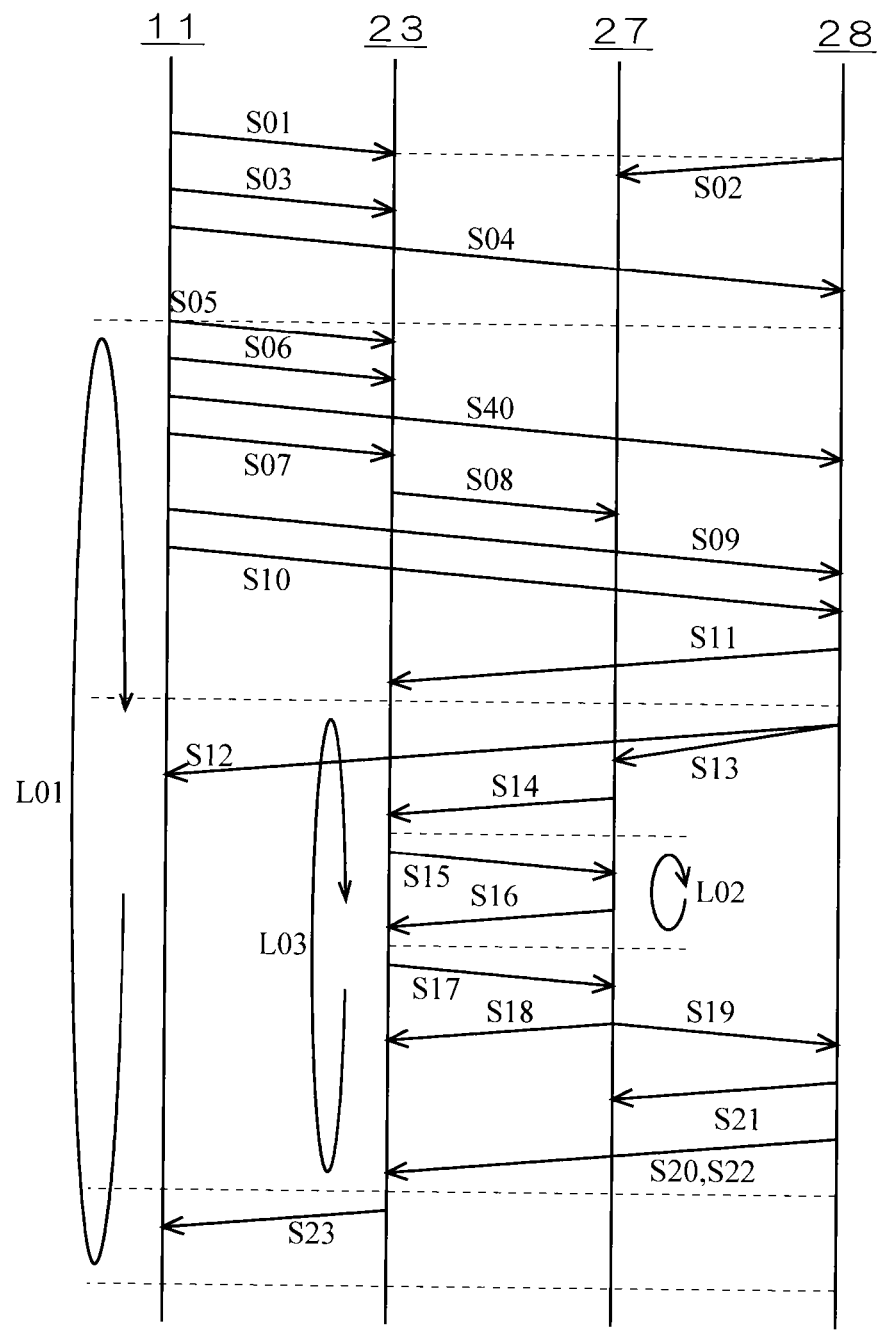
FIG. 15 is a diagram illustrating a control sequence in the image processor in the high-speed mode.

FIG. 15 is a diagram illustrating a control sequence in the image processor 2 in the high-speed mode.

The software processing unit 11 firstly inputs a reset signal S01 for resetting settings information of various registers to an initialized state to the encoding control circuit 23.

Then the NAL coding circuit 28 inputs a wait signal S02 to the entropy coding circuit 27.

The software processing unit 11 inputs an initialization signal S03 including, for example, the settings information described in the above Steps P03, P05, and P07 to the encoding control circuit 23. In the high-speed mode, the initialization signal S03 includes information about a specified number for continuous encoding.

The software processing unit 11 inputs an initialization signal S04 of the stream buffer described in the above Step P02 to the NAL coding circuit 28.

The software processing unit 11 inputs a command S05 to start transferring the image from the memory 13 to the hardware processing unit 12 described in the above Step P08 to the encoding control circuit 23. In the high-speed mode, all of the specified number of captured images to be continuously encoded are prepared in the memory 13.

The software processing unit 11 inputs a setting signal S06 of the quantization matrix described in the above Step P09 to the encoding control circuit 23.

The software processing unit 11 inputs a setting signal S40 to instruct the NAL coding circuit 28 to operate in the high-speed mode to the NAL coding circuit 28.

The software processing unit 11 inputs a command S07 to start macroblock processing described in the above Step P10 to the encoding control circuit 23.

The encoding control circuit 23 inputs a signal S08 to start entropy coding of a macroblock to the entropy coding circuit 27. Hence the entropy coding circuit 27 starts entropy coding of the macroblock.

The software processing unit 11 inputs a setting signal S09 of the header information described in the above Step P11 to the NAL coding circuit 28. In the high-speed mode, header information about all of the specified number of pictures to be continuously encoded is input by batch to the NAL coding circuit 28.

The software processing unit 11 inputs a command S10 to start to form the NAL for the header information described in the above Step P12 to the NAL coding circuit 28.

The NAL coding circuit 28 inputs a clock start signal S11 of the NAL coding circuit 28 to the encoding control circuit 23. Hence the NAL coding circuit 28 starts to form the NAL as described in the above Step P12.

Upon completion of forming of the NAL for the header information, the NAL coding circuit 28 input a NAL-forming completion signal S12 of the header information to the software processing unit 11. In the high-speed mode, the NAL-forming completion signal S12 is input to the software processing unit 11 only when forming of the NAL for the header information about all of the specified number of pictures to be continuously encoded is complete.

The NAL coding circuit 28 also inputs a wait-canceling signal S13 to the entropy coding circuit 27. Hence the data of a macroblock is input from the entropy coding circuit 27 to the NAL coding circuit 28, and the NAL coding circuit 28 forms the NAL for the data of the macroblock.

The entropy coding circuit 27 inputs a completion signal S14 of entropy coding of the macroblock to the encoding control circuit 23.

The encoding control circuit 23 inputs a signal S15 to start entropy coding of a next macroblock to the entropy coding circuit 27. Upon completion of entropy coding of the macroblock, the entropy coding circuit 27 inputs a completion signal S16 of entropy coding of the macroblock to the encoding control circuit 23. As indicated by the loop L02 in the figure, the encoding control circuit 23 repeats the same processes until entropy coding of all macroblocks in the picture is complete.

The encoding control circuit 23 inputs a signal S17 to start entropy coding of the last macroblock to the entropy coding circuit 27. Upon completion of entropy coding of the macroblock, the entropy coding circuit 27 inputs a completion signal S18 of entropy coding of the macroblock to the encoding control circuit 23. The entropy coding circuit 27 also inputs a signal S19 signifying the last macroblock in the picture to the NAL coding circuit 28.

Upon completion of forming of the NAL for slice data of the last macroblock, the NAL coding circuit 28 inputs a clock stop signal S20 of the NAL coding circuit 28 to the encoding control circuit 23. In the high-speed mode, the clock stop signal S20 is input to the software processing unit 11, only when forming of the NAL for the slice data of the last of the pictures to be continuously encoded is complete.

The NAL coding circuit 28 also inputs a weight setting signal S21 to the entropy coding circuit 27.

The NAL coding circuit 28 inputs a NAL-forming completion signal S22 signifying completion of forming the NAL for slice data of one picture to the encoding control circuit 23.

The encoding control circuit 23 starts entropy coding of a next picture, and when forming the NAL for slice data of the picture is complete, the NAL-forming completion signal S22 is input from the NAL coding circuit 28 to the encoding control circuit 23 again. As indicated by the loop L03 in the figure, the encoding control circuit 23 repeats the same processes until forming the NAL for slice data of all of the specified number of pictures to be continuously encoded is complete.

The encoding control circuit 23 inputs a notification S23 signifying a completion of encoding described in the above Step P13 to the software processing unit 11.

As indicated by the loop L01 in the figure, the same processes as described above are repeated until forming the NAL for all target pictures is complete.

As described above, when the operational mode of the hardware processing unit 12 is the high-speed mode, the software processing unit 11 notifies the hardware processing unit 12 of settings information about an output picture (such as a specified number) before the hardware processing unit 12 starts to encode an input picture. The hardware processing unit 12 performs continuous encoding for output pictures, based on settings information notified of by the software processing unit 11, without a notification signifying a completion for every picture. Upon completion of encoding for all of a specified number of output pictures, the software processing unit 11 receives an interrupt notification signifying a completion of encoding S23. In consequence, in performing encoding in the high-speed mode for generating an output picture having a small picture size and a high frame rate, the processing load of the software processing unit 11 is reduced and time required for encoding is shortened, in comparison with encoding involving issuance of commands and interrupt notifications between the software processing unit 11 and the hardware processing unit 12 for every picture.

The software processing unit 11 sets a maximum frame rate of an output picture, based on a maximum picture size and a frame rate corresponding to the maximum picture size processable by the image processor 2, a picture size of the output picture, and a maximum clock frequency of the hardware processing unit 12. Thus effective utilization of the maximum computing power of the image processor 2 and appropriate performance of high-speed encoding are achieved.

The software processing unit 11 notifies the hardware processing unit 12 of information about a specified number of output pictures to be generated by continuous encoding along with the initialization signal S03 (settings information). Thus the hardware processing unit 12 is capable of appropriately processing the specified number of output pictures to be generated by continuous encoding in the high-speed encoding, based on the settings information.

The settings information notified of by the software processing unit 11 to the hardware processing unit 12 is input to the NAL coding circuit 28 (NAL-forming circuit) and the encoding control circuit 23 (control circuit). In this way, settings information required for high-speed encoding is input to the NAL coding circuit 28 and the encoding control circuit 23, so that appropriate performance of high-speed encoding is achieved in the hardware processing unit 12.

The settings information S09 input to the NAL coding circuit 28 includes header information used to form the NAL for the output picture. By inputting the header information required for forming the NAL of the output picture to the NAL coding circuit 28, the NAL for the output picture is formed appropriately in the NAL coding circuit 28.

While the invention has been described in detail, the foregoing description is in all aspects illustrative and not restrictive. It is understood that numerous other modifications and variations can be devised without departing from the scope of the invention.

What is claimed is:

1. An image processor comprising:
a memory configured to store a target picture for image processing;
a software processing unit configure to perform image processing on a picture by software processing; and
a hardware processing unit configured to perform image processing on a picture by hardware processing,
the software processing unit having a multi mode as an operational mode of the hardware processing unit, the multi mode being a mode for encoding an input picture within a vertical synchronization period specified based on a maximum computing power of the image processor so as to generate a plurality of output pictures that are different in at least one of a picture size and a frame rate, the vertical synchronization period being a time period for encoding per picture with respect to a sequence having the highest frame rate among multiple sequences processed in multi-encoding, wherein
in the multi mode,
the software processing unit notifies the hardware processing unit by a plurality of settings information sets about a plurality of output pictures to be generated in each vertical synchronization period before the hardware processing unit starts to encode an input picture,
the hardware processing unit performs continuous encoding for the output pictures in each vertical synchronization period, based on the settings information sets notified of by the software processing unit, without a notification signifying a completion for every picture, and upon completion of encoding for all of the output pictures to be generated in each vertical synchronization period, sends an interrupt notification signifying a completion of encoding to the software processing unit, and the hardware processing unit including:
a coding circuit configured to code an input picture;
a NAL-forming circuit configured to form NAL for the picture coded by the coding circuit; and
a control circuit configured to control the coding circuit and the NAL-forming circuit,
wherein
the settings information sets notified of by the software processing unit to the hardware processing unit is input to the NAL-forming circuit and the control circuit.

2. The image processor according to claim 1, wherein
the software processing unit sets a picture size and a frame rate of each of a plurality of output pictures, based on a maximum picture size and a frame rate corresponding to the maximum picture size processable by the image processor, and a use of the output pictures.

3. The image processor according to claim 2, wherein with output pictures to be generated in a plurality of continuous vertical synchronization periods being different in frame rates of the output pictures, the software processing unit notifies the hardware processing unit of information for identifying an output picture among a plurality of output pictures to be generated in each vertical synchronization period along with the settings information sets.

4. The image processor according to claim 1, wherein the settings information sets input to the NAL-forming circuit include header information to be used to form NAL for each output picture.

5. The image processor according to claim 1, wherein with output pictures to be generated in a plurality of continuous vertical synchronization periods being different in frame rates of the output pictures, the software processing unit notifies the hardware processing unit of information for identifying an output picture among a plurality of output pictures to be generated in each vertical synchronization period along with the settings information sets.

6. The image processor according to claim 1,
the software processing unit further having a high-speed mode as an operational mode of the hardware processing unit, the high-speed mode being a mode for encoding an input picture so as to generate an output picture having a picture size smaller than a maximum picture size processable by the image processor and a frame rate higher than a frame rate corresponding to the maximum picture size, wherein
in the high-speed mode,
the software processing unit notifies the hardware processing unit of settings information about output pictures before the hardware processing unit starts to encode an input picture, and the hardware processing unit performs continuous encoding for the output pictures, based on the settings information notified of by the software processing unit, without a notification signifying a completion for every picture, and upon completion of encoding for all of a specified number of the output pictures, sends an interrupt notification signifying a completion of encoding to the software processing unit.

7. The image processor according to claim 6, wherein
the software processing unit sets a maximum frame rate of an output picture, based on a maximum picture size and a frame rate corresponding to the maximum picture size processable by the image processor, a picture size of an output picture, and a maximum clock frequency of the hardware processing unit.

8. The image processor according to claim 7, wherein
the software processing unit notifies the hardware processing unit of information about a specified number of output pictures to be generated by continuous encoding along with the settings information.

9. The image processor according to claim 8, wherein the settings information sets input to the NAL-forming circuit include header information to be used to form NAL for output pictures.

10. The image processor according to claim 6, wherein
the software processing, unit notifies the hardware processing unit of information about a specified number of output pictures to be generated by continuous encoding along with the settings information.

11. The image processor according to claim 6, wherein the settings information sets input to the NAL-forming circuit include header information to be used to form NAL for output pictures.

* * * * *